Oct. 7, 1930.                A. SCHMID                1,777,937
                           FRICTION CLUTCH
                         Filed Feb. 7, 1928
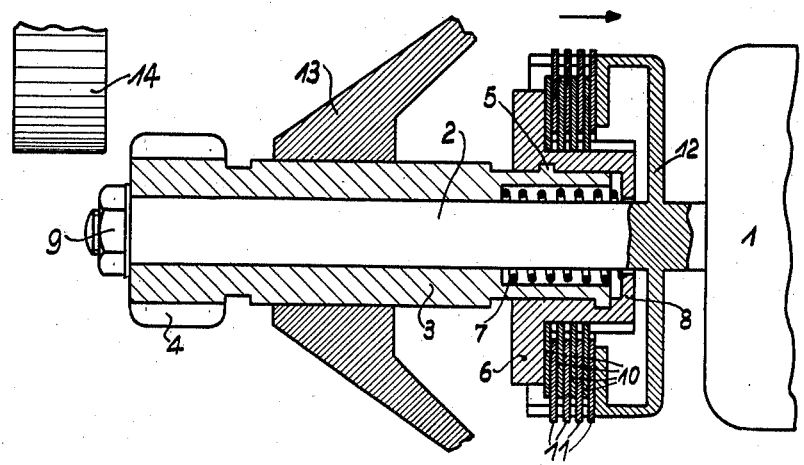
Inventor
Anton Schmid
by Steward & McKay
his attorneys Patented Oct. 7, 1930

1,777,937

UNITED STATES PATENT OFFICE

ANTON SCHMID, OF STUTTGART, GERMANY, ASSIGNOR TO ROBERT BOSCH AKTIENGESELLSCHAFT, OF STUTTGART, GERMANY

FRICTION CLUTCH

Application filed February 7, 1928, Serial No. 252,646, and in Germany February 14, 1927.

The present invention relates to friction clutches and more particularly to friction clutches suitable for use with starting devices for motor vehicles.

A construction of automatically disengaging disc clutches for electric starters of motor vehicles is known, in which a shaft carrying a screw thread is longitudinally displaceable in a groove on the armature spindle. The nut turning on this thread carries one-half of the disc clutch, whilst the other half is connected with the pinion. The pinion can consequently only be exchanged by completely dismantling the clutch, which would be very undesirable in view of the mounting of the various constructions of the pinion and for rapid replacement of a worn pinion.

In order to avoid this disadvantage, the pinion of the starter gear and the half of the friction clutch attached thereto are according to the present invention threaded on one another. The pinion can therefore be removed from the friction clutch and replaced by another without having to dismantle the clutch.

A mechanism for the electric starter for a motor car engine is shown in the accompanying drawing as one form of construction of the invention.

The starter has an armature 1 with the spindle or driving shaft 2 on which a hollow shaft 3 is adapted to slide. One end of the hollow shaft is constructed as a starting pinion 4 and the other end as a high-pitched external thread 5, the rise of which extends in the same direction as the direction of rotation of the armature 1. A nut 6 is fitted on the thread 5.

The hollow shaft 3 is bored out to a slightly greater extent at its threaded end, i. e., is of greater internal diameter at this end, and receives a spiral spring 7 which bears against a flange 8 on the nut 6.

A nut 9 mounted on the shaft 2 forms a stop for the displacement of the pinion 4 to the left. The nut 6 carries discs 10 of the one half of a disc clutch by a suitable drive connection, the nut and discs thus constituting a driven clutch member, whilst discs 11 of the other half of the clutch are connected with a flange 12 on the spindle 2, the latter discs and flange constituting a driving clutch member. 13 is a bearing for the shaft 2 and 14 is the fly wheel of the internal combustion engine to be started.

In the position of rest of the armature 1 as shown, the spiral spring 7 tends to unscrew or force apart the shaft 3 and the nut 6, and thereby forces the pinion against the abutment 9 and also the nut 6 in the opposite direction i. e., in the direction of the arrow, so that the discs 10 contact lightly with the discs 11.

On starting, the shaft 2 is displaced in any suitable manner towards the fly wheel 14. The armature 1 rotates and together with it the pinion shaft 3 which retains its original position relative to the nut 6. Upon the meshing of the pinion with the toothed rim of the fly wheel, the pinion shaft meets with resistance and therefore exerts a pressure on the nut 6 in the direction of the arrow, so that the discs 10 are pressed firmly against the discs 11. The disc clutch then transmits the full rotational moment of the armature to the pinion, and the clutch pressure exerted by the pinion shaft 3 through the nut 6 is higher, the greater the moment of rotation set up on starting.

When the engine commences to over run the armature, the fly wheel no longer offers any resistance to the pinion. The axial pressure exerted by the pinion shaft 3 through the nut 6 is reversed and is now opposed to the direction of the arrow so that the discs 10 are no longer forced against the discs 11. The pinion 4 and shaft 2 can continue to rotate independently of one another.

If the pinion does not mesh automatically with the toothed rim of the fly wheel, but the teeth of the pinion first abut against the side of the teeth on the fly wheel, then the discs 10 and 11 of the clutch will also be forced together. The pinion shaft 3 will thus rotate with the armature and the pinion soon finds the next tooth gap on the rim of the fly wheel for meshing.

If it is desired to change the pinion for another one, it is only necessary to loosen the stop nut 9 and the pinion shaft 3 can then be withdrawn from the nut 6 and replaced by another.

This form of construction avoids the necessity of a special bearing for the free end of the driving shaft such as is provided in the known construction mentioned above.

I claim:

1. A transmission drive for starting devices in automobile vehicles consisting of an armature, a driven pinion, a shaft for said armature, a hollow shaft surrounding said armature shaft and on which said pinion is formed at one end, a plurality of friction discs connected to turn with said armature shaft, a nut mounted on the opposite end of said hollow shaft by means of a screw thread and a further number of friction discs mounted on said nut to turn therewith so that said pinion is detachably operatively connected to said further number of friction discs.

2. In a starting drive for automobile starting devices, a driving shaft, a driving clutch member mounted on the shaft in fixed relation thereto, a driven clutch member, and a starting pinion mounted directly on the shaft and in threaded engagement with the driven clutch member.

3. In a starting drive for automobile starting devices, a driving shaft, a driving clutch member mounted on the shaft in fixed relation thereto, a driven clutch member, and a pinion shaft and starting pinion fixed to said pinion shaft, said pinion shaft being in threaded engagement with said driven clutch member.

4. In a starting drive for automobile starting devices, a driving shaft, a driving clutch member mounted on the shaft in fixed relation thereto, a driven clutch member, a pinion shaft and starting pinion fixed to said pinion shaft, said pinion shaft being in threaded engagement with said driven clutch member, an abutment for the pinion arranged to limit the movement of the pinion and pinion shaft away from the driving clutch member and tension means arranged to lightly force the pinion and pinion shaft against the abutment and to lightly force the driven clutch member away from the pinion and pinion shaft against the driving clutch member with a force substantially less than the required to transmit the full power of the driving shaft.

5. In a starting drive for automobile starting devices, a driving shaft, a driving clutch member mounted on the shaft in fixed relation thereto, a driven clutch member situated between the driving clutch member and one end of the shaft, a pinion shaft and starting pinion fixed to said pinion shaft, said pinion shaft being in the form of a hollow shaft mounted directly upon the driving shaft between the said end of the driving shaft and the driving clutch member and in threaded engagement with the driven clutch member, an abutment for the pinion mounted at the said end of the driving shaft to limit the movement of the pinion along the shaft away from the driving clutch member, and tension means arranged to lightly force the pinion and pinion shaft against the abutment and to lightly force the driven clutch member away from the pinion and pinion shaft against the driving clutch member with a force substantially less than required to transmit the full power of the driving shaft.

6. In a starting drive for automobile starting devices, a driving shaft, a driving clutch member fixed to the shaft, a driven clutch member mounted about the shaft between one end of the shaft and the driving clutch member and provided with a threaded socket opening toward said end of the shaft, a starting pinion arranged to be slid directly on to said one end of the shaft into threaded engagement with the driven clutch member through said threaded socket, and an abutment for said pinion removably attached to the said end of the shaft.

7. In a starting drive for automobile starting devices, a driving shaft, a driving clutch member fixed to said shaft, a driven clutch member mounted about the shaft and provided with a threaded socket opening toward a free end of the shaft, a starting pinion arranged to be slid on to said free end of the shaft into threaded engagement with the threaded socket in the driven clutch member, an abutment for said pinion removably attached to said free end of the shaft, and tension means situated between said pinion and said driven clutch member arranged to tend to move them apart, the pinion against the abutment and the driven clutch member against the driving clutch member, the spiral direction of the threaded engaging arrangement between the pinion and driven clutch member being in such relation to the direction of rotation of the shaft as to tend to separate said pinion and driven clutch member when the pinion resists the movement of the driven clutch member.

In testimony whereof I have hereunto affixed my signature.

ANTON SCHMID.